United States Patent [19]
Cutler

[11] Patent Number: 5,428,074
[45] Date of Patent: * Jun. 27, 1995

[54] METHOD FOR SEPARATING ION EXCHANGE RESINS AND FOR REMOVING METALLIC FOULANTS FROM THE RESINS

[76] Inventor: Frances M. Cutler, 17701 Anglin La., Tustin, Calif. 92680

[*] Notice: The portion of the term of this patent subsequent to Jan. 14, 2009 has been disclaimed.

[21] Appl. No.: 704,709

[22] Filed: May 17, 1991

Related U.S. Application Data

[63] Continuation of Ser. No. 551,481, Jul. 10, 1990, abandoned, which is a continuation-in-part of Ser. No. 114,034, Oct. 29, 1987, Pat. No. 5,081,159.

[51] Int. Cl.$^6$ ............................................. B01D 15/06
[52] U.S. Cl. ........................................ 521/26; 521/25
[58] Field of Search ................................. 521/26, 25

[56] References Cited

U.S. PATENT DOCUMENTS

| | | | |
|---|---|---|---|
| 2,366,651 | 1/1945 | Rawlings | 521/26 |
| 3,385,787 | 5/1968 | Crits | 210/673 |
| 3,582,504 | 6/1971 | Salem | 521/26 |
| 4,388,417 | 6/1983 | Down et al. | 521/26 |
| 4,511,675 | 4/1985 | Auerswald | 521/26 |
| 4,524,153 | 6/1985 | Funabashi et al. | 521/26 |
| 4,622,141 | 11/1986 | Salem et al. | 521/26 |
| 4,652,352 | 3/1987 | Saieva | 204/105 R |
| 4,663,051 | 5/1987 | Flynn et al. | 521/26 |
| 4,820,421 | 4/1989 | Auerswald | 210/670 |

FOREIGN PATENT DOCUMENTS 61-234951 10/1986 Japan.

OTHER PUBLICATIONS

Seprex TM Process Used in Power Plants in the U.S. and Sold by Grover Water Division of Ecodyne.
Resin Density Determination —Water Pycnometer Method, letter from Dow Chemical dated Nov. 18, 1983, U.S.A.
Salem et al., "A Unique Advance in Condensate Polishing at Central Illinois Public Service," The Int'l Water Conference of the Engineers' Society of Western Pennsylvania, 44th Annual Meeting, Oct. 1983, Puttsburgh, PA.
Izumi et al., "Curd Removal Characteristics of Newly Developed Ion Exchange Resins", a paper presented at the 50th Anniversary meeting of the Int'l Water Conference held in Pittsburgh, Pennsylvania, on Oct. 23-25, 1989.
Inami et al., "Mechanism of Crud Removal by Deep Bed Resins," a paper presented at the 50th Anniversary meeting of the Int'l Water Conference held at Pittsburgh, Pennsylvania, Oct. 23-25, 1989.

Primary Examiner—Thurman K. Page
Assistant Examiner—Peter F. Kulkosky
Attorney, Agent, or Firm—Ashok K. Janah; Jeffrey G. Sheldon

[57] ABSTRACT

In a method for separating and regenerating a mixed bed of exhausted anion and cation resins and for removing metallic foulants from the mixed bed, substantially all of the cation and anion resins in the bed are separated by their respective buoyancies and metallic foulants are displaced from the resins using an amine salt solution having a density between the densities of the anion and cation resins. A composition formed during this method comprises the anion resin, the metallic foulants, the cation resin, and the amine salt solution.

39 Claims, 2 Drawing Sheets

METHOD FOR SEPARATING ION EXCHANGE RESINS AND FOR REMOVING METALLIC FOULANTS FROM THE RESINS

This is a continuation of application Ser. No. 07/551,481 filed on Jul. 10, 1990, now abandoned which was itself a continuation-in-part of application Ser. No. 07/114,034, filed Oct. 29, 1987, now U.S. Pat. No. 5,081,179.

BACKGROUND

The present invention is directed to a method for separating and regenerating a mixed bed of anion and cation resins, for removing metallic foulants from the mixed bed, and to a composition formed during the practice of the method.

Mixed-bed systems containing anion and cation exchange resins have many industrial applications. A primary application of such a system is in the purification of water for condensate recirculation systems used to drive steam turbines in fossil fuel and nuclear facilities. It is essential that this water be of an extremely high purity level in order to avoid any adverse effects on the surfaces of turbine blades, boilers, pipes, heat exchangers, and other parts of the facility.

A particular problem with ion exchange systems is the production of ion leakage. Ion leakage can result from the failure of the ion exchange resins in the mixed bed to remove ions from the water and the passage of the unremoved ions past the mixed bed. In addition, the introduction into the water of undesired ions by the resins themselves can also contribute to ion leakage.

The leakage of regenerant chemical ions from the resins arises primarily from the difficulty in perfectly separating the anion and cation resins in the mixed bed prior to regeneration of the resins. A conventional technique for effecting such separation is by passing water upwardly through the resins. This upward flow of water stratifies the resins by carrying the less dense anion exchange resin to the top of the separation vessel, while the denser cation exchange resin sinks to the bottom of the separation vessel. While this method is effective for separating the bulk of the resins into two strata or layers, perfect separation cannot be achieved. A primary source for imperfect separation is resin fines that are produced during handling of the resins. Since upflow separation depends on the particle size as well as the density of the resins, the cation exchange resin fines do not sink to the bottom of the separation vessel, but are carried upwardly with the anion exchange resin. When the resins are subsequently isolated from one another, and the anion exchange resin is regenerated with sodium hydroxide, sodium ions can be introduced into the ion exchange sites in the entrained cation resin. When the resins are returned to the service vessel, the sodium ions can be displaced from the cation resin by cations present in the influent water that have either a higher selectivity or affinity for the cation resin, e.g., ammonium. The sodium ions can also be displaced from the cation resin due to equilibrium leakage. The displaced sodium ions are thereby introduced into the water being treated, producing sodium leakage.

Also, anion resins can be entrapped among the cation resin during the passage of water upwardly through the mixed bed of resins. When this occurs, the regeneration of the cation resin with sulfuric acid exhausts the entrained anion resin to the sulfate and bisulfate forms. When the resins are returned to the service vessel, the sulfate ions are introduced into the water being treated, thereby producing sulfate leakage. It is believed that sulfate leakage from the anion resin is primarily due to the bisulfate ions being driven off the anion resin by ammonium hydroxide which is typically used to control the pH of the influent water.

In addition to not achieving perfect separation, the conventional technique for separating anion and cation resins possesses several further disadvantages. For example, the size of the cation resin capable of being employed in the mixed bed is unduly restricted. This is because resin size, as noted above, as well as resin density, are factors which contribute to the efficiency of the conventional backwash separation procedure. Accordingly, the conventional backwash procedure requires that the cation resin be larger than the anion resin. This restriction limits the efficiency of the cation resin since larger-size resin particles have less surface area per unit volume and therefore exhibit slower ion transfer rates or kinetics.

Furthermore, the vessel or zone through which the water is passed upwardly to stratify the resins typically has a fixed anion resin takeoff location or point. Accordingly, the bulk volume of cation resin employed in the mixed bed is restricted since the bulk volume of the cation resin must be sufficient to occupy the volume of the zone below the anion resin takeoff point, thereby causing the upwardly lifted anion resin to occupy a volume above the anion takeoff point.

Another commercially used method for separating and isolating exhausted anion and cation exchange resins is disclosed in U.S. Pat. No. 3,582,504. The method of U.S. Pat. No. 3,528,504 comprises first separating the resins in the conventional manner by passing a liquid upwardly through the resins to position the anion resin in an upper layer and the cation resin in a lower layer. The layers are then conventionally isolated from one another so that the anion exchange resin occupies an anion exchange resin zone and the cation exchange resin occupies a cation resin zone. It is estimated that the anion resin in the anion exchange resin zone generally contains less than about 10 percent volume/volume (% v/v) entrained cation resin and more typically less than about 5% v/v entrained cation resin.

The process of U.S. Pat. No. 3,582,504 is characterized in that an intermediate-density liquid is then delivered to the anion exchange resin to remove the entrained cation resin from the anion resin zone. This intermediate-density liquid has a density intermediate between the densities of the anion exchange resin and the cation exchange resin, i.e., greater than the anion exchange resin and less than the cation exchange resin. The intermediate density liquid is delivered to the anion exchange resin in an amount sufficient to cause the anion resin to float and the cation resin to sink. The separated anion exchange resin is then isolated from the entrained cation exchange resin.

U.S. Pat. No. 3,582,504 discloses that numerous intermediate-density liquids, e.g., organic liquids and aqueous solutions of inorganic compounds that have a density intermediate between the anion and cation exchange resins, can be employed. U.S. Pat. No. 3,582,504 specifically mentions sodium sulfate and alkali metal hydroxide solutions, the most preferred alkali metal hydroxide solution being a sodium hydroxide solution.

There are several distinct disadvantages with the separation process of U.S. Pat. No. 3,582,504. First, the process employed in U.S. Pat. No. 3,582,504 still separates the bulk of the anion and cation resins by the conventional technique of passing water upwardly through the resins. As noted above, this separation process can leave entrapped anions in the cation resin and thereby can continue to contribute to sulfate leakage due to exhausting the entrained anion resins with sulfuric acid. Second, the cation resin entrained in the separated anion resin can be exhausted, e.g., to sodium, during the separation of the entrained cation resin from the anion resin, e.g., with sodium hydroxide. Even though the exhausted cation resin can later be regenerated with the cation resin, it is very difficult to fully regenerate a cation resin that has been exhausted by contact with sodium ions. Therefore, the exhausted cation resin can contribute to sodium leakage.

Third, because conventional backwashing is employed to separate the bulk of the anion and cation resins, the size of the cation resin capable of being employed in the mixed resin bed continues to be unduly restricted.

Fourth, the bulk volume of cation resin employed in the mixed bed also continues to be unduly restricted because of the continued use of the fixed anion resin takeoff point in the backwash separation procedure.

Thus, the problem of ion leakage is not solved by prior-art methods for separating mixed-resin beds. A further problem with mixed-bed ion exchange systems is due to contamination of mixed-bed resins with metallic foulants. Contamination by metallic foulants can reduce the service life of mixed-bed resins.

The metallic foulants typically present in condensate water are mixtures of iron and iron oxides. Copper, titanium and steel can also be present in the condensate water. Metallic foulants such as the iron and iron oxide foulants may originate from a layer of magnetite purposely adhered to the surfaces of power plant condensate system heat exchange equipment. Magnetite is adhered to protect the condensate equipment surfaces from corrosion.

Metallic foulants dissolved or suspended in condensate water can become attached to and foul the ion exchange resin beads. Attachment to the resin beads can occur by ion exchange and filtration processes. Metallic fouling of resins can reduce resin service life in several ways. Firstly, the metallic foulants can react with oxygen resulting in oxidative catalysis and resin bead degradation. Secondly, the cation and anion resin breakdown products resulting from oxidative catalysis can cross-contaminate each other. Thirdly, organic foulants present in the condensate water can be picked up by the resins and complex with metallic foulants already adhering to the resins. Complexing with organics can cause the metallic foulants to become tightly bound to the resin beads and therefore very difficult to remove from the resins.

Removal of metallic foulants has been attempted through mechanical cleaning procedures such as backwashing, air scrubbing, and rinsing. Ultrasonic cleaning, acid washes, and surfactants have also been used.

Even repeated mechanical cleansing steps can leave significant amounts of metallic foulants adhering to the resins. Ultrasonic cleaning vibrates the resin beads. Significant resin bead breakage can thereby occur. Acid washes can result in heat generation and resin degradation. Hydrochloric acid washes for removal of metallic foulants are in common use. Hydrochloric acid treatment of a mixed-resin bed puts the anion resin into the undesirable chloride form. Additionally, hydrochloric acid can dissolve metallic foulants. Dissolved metallic foulants cannot stratify into distinct layers. Surfactants used to remove metallic foulants can bind to the resins. Surfactant release from in-service resins can cause a variety of problems including the development of corrosion products and misleading or false resin conductivity measurements.

Thus, there is a need for a process for separating the bulk of the cation and anion resins and for removing metallic foulants from the resins that: (a) yields better separation of the cation and anion resins; (b) does not limit either the size or bulk volume of resins that can be employed in a mixed bed; (c) does not adversely exhaust either the cation or the anion resin; and (d) removes metallic foulants without significant resin damage.

SUMMARY

The present invention satisfies this need. The method of the present invention (a) enables substantially all of the anion and cation resins to be separated from one another, (b) does not restrict either the size or the bulk volume of the resins that can be employed in a mixed-resin bed, (c) does not adversely exhaust either the cation or the anion resin, (d) removes significant amounts of metallic foulants not removed from the resins by mechanical cleaning procedures, and (e) does not significantly damage the resins.

A method according to the present invention for separating and regenerating a mixed bed of anion and cation resins, and for removing metallic foulants from the mixed bed uses an amine salt solution. The amine salt solution separates substantially all the anion and cation resins and removes metallic foulants from the resins. The amine salt solution used has a density greater than the density of the anion resin and less than the density of the cation resin. Accordingly, the anion resin floats and the cation resin sinks in the solution.

The amine salt solution can also cause a density separation of metallic foulants displaced from the resins. Metallic foulants with densities between the densities of the anion and cation resins become suspended in the amine salt solution between the anion and cation resin layers. An additional layer of metallic foulants with densities less than the density of the anion resin can also be displaced from the resins to float as a layer of metallic foulants above the anion resin. The metallic foulants can include iron-containing particles.

Because substantially all of the anion and cation resins are separated due to their respective buoyancies in the amine salt solution, any desired anion and cation particle size can be employed in the mixed bed. Similarly, because the position of the anion resin layer in a separation vessel or zone can easily be adjusted by the volume of amine salt solution introduced into the separation zone, the ability to efficiently separate the anion and cation resins is no longer dependent on the bulk volume of the cation resin employed in the mixed bed. Therefore, the separation method of the instant invention enables any convenient bulk volume of cation resin to be employed in the mixed bed. Another benefit of the method of the present invention is that the cation resin is at least partially regenerated by the amine salt solution without adversely exhausting the anion resin. Furthermore, the present method can improve upon the amount of metallic foulants removed from the resins by mechanical cleaning steps alone.

More particularly, a method of the instant invention comprises the steps of (a) introducing the amine salt solution into a separation zone containing the mixed bed of resins thereby causing the anion resin to float in the solution, the cation resin to sink in the solution, and a layer of metallic foulants to become suspended in the solution between the anion and cation resins; and (b) separating the anion resin, the cation resin and the amine salt solution containing suspended metallic foulants from each other so that substantially all of the anion resin occupies an anion regeneration zone, and substantially all of the cation resin occupies a cation regeneration zone. The separating step can result in removing substantially all the amine salt solution containing metallic foulants from the resins.

The method can also include the steps of (1) rinsing the cation resin in the cation regeneration zone and the anion resin in the anion regeneration zone to displace the amine salt solution from the resins; and (2) regenerating the anion resin. In general, the mixed bed of resins comprises at least about 25% v/v cation resin.

The method can result in the displacement from the resin of metallic foulants with densities less than the density of the anion resin. These metallic foulants become suspended in the amine salt solution above the anion resin.

In typical power plant installations, prior to step (a) the mixed bed of anion and cation resins is transferred from a service or water treatment zone to the separation zone. Optionally, the cation resin can be further regenerated, if necessary, to achieve a desired degree or form of regeneration.

When the separation zone and the cation regeneration zone are located in the same vessel, it is preferred that after step (b) the method further comprises the steps of (i) introducing additional amine salt solution into the vessel housing the separation and cation regeneration zones, (ii) allowing any residual anion resin in the vessel to be floated by the solution, and (iii) transferring substantially all of the floated residual anion resin from the vessel to the anion regeneration zone. Alternatively, the separation zone and the anion regeneration zone can be located in the same vessel.

Although not necessary for purposes of separating the anion from the cation resin, a mechanical cleansing step such as a backwash procedure is preferably employed prior to step (a) to remove contaminants, including metallic foulants, from the resins.

To avoid exposing the resins to osmotic shock, it is preferred that prior to step (a) an initial amine salt solution be introduced into the mixed resins. The initial amine salt solution has a density less than the densities of the anion and cation resins. The density of the amine salt being introduced into the mixed resins is then increased so that the amine salt solution being introduced into the mixed resins has a density of the amine salt solution of step (a).

The amine salt solution comprises an amine salt having a cation moiety and an anion moiety. The cation moiety is selected from the group consisting of hydrazine, cyclohexamine, morpholine, ammonium, and mixtures thereof. Preferably, the cation moiety is ammonium. The anion moiety is selected from the group consisting of sulfate, bisulfate, carbonate, bicarbonate, citrate, nitrate, oxalate, acetate, pentaborate, and mixtures thereof. Preferably, the anion moiety is selected from the group consisting of sulfate, bisulfate, carbonate, bicarbonate, citrate, and mixtures thereof. A preferred amine salt solution is an ammonium sulfate solution.

Although the anion resin generally has a density less than the density of the cation resin, it is believed that there are certain situations wherein the anion resin can have a density greater than the density of the cation resin. Nevertheless, the amine salt solution can be used to separate the anion and cation resins and to remove metallic foulants from the resins irrespective of which resin is the denser resin, provided that the anion and cation resins differ in their respective densities.

The method of the instant invention has significant advantages. It yields a better separation of the anion and cation resins, it does not restrict the size or bulk volume of either the anion or cation resin used in the mixed bed, it does not adversely exhaust either the anion or cation resin, it removes more metallic foulants from the resins than is possible by mechanical cleaning steps alone, and the method results in no significant injury to the resins.

DRAWINGS

These and other features, aspects, and advantages of the present invention will become better understood with reference to the following description, appended claims, and accompanying drawings.

DESCRIPTION

Figure 1:
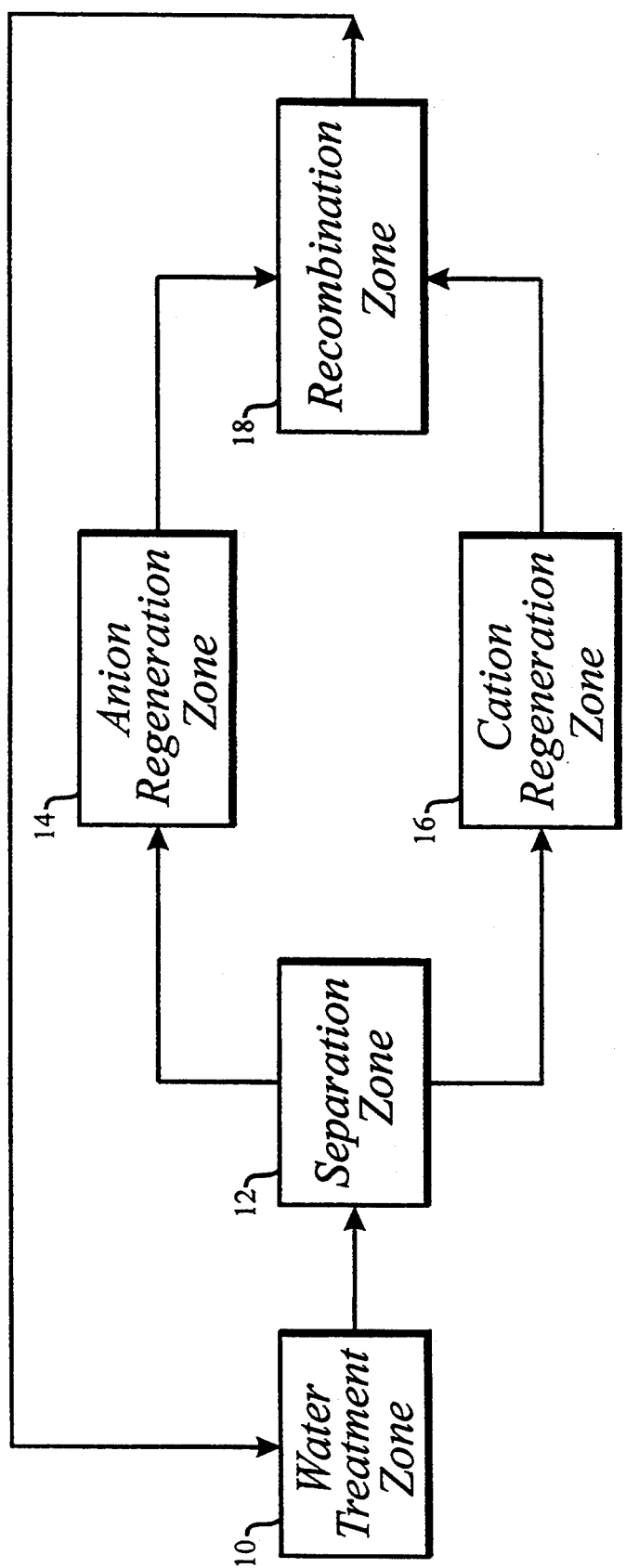
FIG. 1 is a schematic diagram of a process according to the present invention.

This invention is directed to a method for separating a mixed bed of anion and cation resins and for removing metallic foulants from the mixed bed. In particular, the invention is directed to a method for separating and regenerating a mixed bed of exhausted anion and cation resins and for removing metallic foulants from the mixed bed of exhausted resins. In general, mixed beds comprise at least about 25 percent volume/volume (% v/v) cation resin. Because amine treatment is typically used for corrosion control, the mixed beds typically comprise greater than about 50% v/v cation resin. In addition, the invention is directed to a composition produced during the separation of the mixture of cation and anion resins.

Exemplary cation resins that can be separated, regenerated and defouled of metallic foulants in accordance with the present invention include, but are not limited to, carboxylic and sulfonic polystyrene resins such as styrene divinyl benzene resins. Exemplary anion resins that can be separated and regenerated in accordance with the present invention include, but are not necessarily limited to, Type I, Type II, polystyrene, polyamide, phenolic, polyamine, epoxy polyamine, acrylic polyamine, and macroreticular tertiary amine resins. In general, the anion resins have a density less than about 1.2 and the cation resins have a density greater than about 1.2. Exemplary specific gravities for both new and previously used anion resins which have been exhausted by sulfate are set forth in Table I, infra.

TABLE I

| Anion Resin[1] | Specific Gravity[2] | Temp, °C. |
|---|---|---|
| A Ambersep 900[4] (used) | 1.091 | NA[3] |
| A Ambersep 900 (new) | 1.088 | 20.4 |

TABLE I-continued

| Anion Resin[1] | Specific Gravity[2] | Temp, °C. |
|---|---|---|
| B Dowex TGA[5] (used) | 1.131 | 19.8 |
| B Dowex TGA (new) | 1.124 | 20.4 |
| C Macroporous (used) | 1.106 | 19.8 |
| C Macroporous (new) | 1.132 | 19.9 |
| D Macroporous (new) | 1.096 | 21.0 |
| E Dowex SBR-C[6] (new) | 1.102 | 21.0 |

[1] All anion resins listed are Type I resins.
[2] Specific gravity determined according to the Dow Water Pycnometer Method (1983).
[3] NA denotes not available.
[4] Ambersep 900 brand Type I resin is manufactured by Rohm & Haas Co., Philadelphia, Pennsylvania.
[5] Dowex TGA brand Type I, gel resin is manufactured by Dow Chemical Co., Midland, Michigan.
[6] Dowex SBR-C brand Type I, gel resin is manufactured by Dow Chemical Co., Midland, Michigan.

The method of the present invention is characterized by the use of an amine salt solution to separate the bulk of the cation and anion resins and to remove metallic foulants from the resins. The amine salt solution comprises an amine salt having a cation moiety and an anion moiety. Exemplary cation moieties include, but are not necessarily limited to, hydrazine, cyclohexamine, morpholine, ammonium, and mixtures thereof. Preferably, the cation moiety is ammonium. Exemplary anion moieties include, but are not limited to, sulfate, bisulfate, carbonate, bicarbonate, citrate, nitrate, oxalate, acetate, pentaborate, and mixtures thereof. Preferably, the anion moiety is selected from the group consisting of sulfate, bisulfate, carbonate, bicarbonate, citrate, and mixtures thereof. A preferred amine salt solution is an ammonium sulfate salt solution.

Tables II–VI set forth the densities of exemplary amine salt solutions as a function of temperature. The densities were determined by dividing the weight of the solution by its volume at the same temperature.

TABLE II

Ammonium Sulfate $(NH_4)_2SO_4$

| Concentration % (w/w) | Density, gm/ml | | | |
|---|---|---|---|---|
| | 21.2° C. | 36.0° C. | 47.6° C. | 56.0° C. |
| 30.0 | 1.171 | 1.166 | 1.161 | 1.157 |
| 31.8 | 1.182 | 1.176 | 1.171 | 1.168 |
| 34.0 | 1.194 | 1.189 | 1.184 | 1.180 |
| 35.9 | 1.205 | 1.199 | 1.194 | 1.191 |
| 37.9 | 1.216 | 1.211 | 1.206 | 1.202 |
| 40.1 | 1.229 | 1.223 | 1.219 | 1.215 |
| 42.0 | 1.239 | 1.234 | 1.230 | — |

TABLE III

Ammonium Citrate - Dibasic $(NH_4)HC_6H_5O_7$

| Concentration % (w/w) | Density, gm/ml | | | |
|---|---|---|---|---|
| | 20.3° C. | 36.0° C. | 47.6° C. | 56.0° C. |
| 31.9 | 1.144 | 1.138 | 1.132 | 1.127 |
| 33.3 | 1.150 | 1.144 | 1.138 | 1.133 |
| 36.0 | 1.164 | 1.157 | 1.151 | 1.147 |
| 38.0 | 1.173 | 1.166 | 1.161 | 1.155 |
| 39.9 | 1.183 | 1.176 | 1.171 | 1.167 |
| 41.9 | 1.193 | 1.186 | 1.180 | 1.175 |
| 44.0 | 1.204 | 1.196 | 1.190 | 1.186 |
| 46.0 | 1.212 | 1.205 | 1.200 | 1.195 |

TABLE IV

Ammonium Carbonate

| Concentration % (w/w) | Density, gm/ml | | | |
|---|---|---|---|---|
| | 20.5° C. | 36.0° C. | 47.6° C. | 56.0° C. |
| 10.0 | 1.043 | 1.037 | 1.031 | 1.026 |
| 12.0 | 1.052 | 1.045 | 1.040 | 1.035 |
| 14.0 | 1.062 | 1.054 | 1.048 | 1.043 |
| 16.0 | 1.070 | 1.062 | 1.056 | 1.051 |
| 17.7 | 1.078 | 1.070 | 1.063 | 1.058 |
| 20.0 | 1.088 | 1.080 | 1.073 | 1.067 |

TABLE V

Ammonium Bisulfate $NH_4HSO_4$

| Concentration % (w/w) | Density, gm/ml | | | |
|---|---|---|---|---|
| | 20.3° C. | 36.0° C. | 47.6° C. | 56.0° C. |
| 24.0 | 1.140 | 1.132 | 1.125 | 1.119 |
| 28.0 | 1.165 | 1.156 | 1.149 | 1.144 |
| 32.0 | 1.191 | 1.181 | 1.174 | 1.168 |
| 36.0 | 1.216 | 1.206 | 1.198 | 1.193 |
| 40.0 | 1.242 | 1.232 | 1.224 | 1.219 |

TABLE VI

Ammonium Pentaborate - $(NH_4)B_{10}O_{16}$

| Concentration % (w/w) | Density, gm/ml | | | |
|---|---|---|---|---|
| | 20.8° C. | 36.0° C. | 47.6° C. | 56.0° C. |
| 2.00 | 1.011 | 1.006 | 1.001 | 0.997 |
| 3.00 | 1.017 | 1.012 | 1.008 | 1.004 |
| 3.99 | 1.024 | 1.018 | 1.014 | 1.009 |
| 5.01 | 1.030 | 1.025 | 1.020 | 1.016 |

The densities achieved for ammonium pentaborate, as shown in Table VI, supra, are not sufficient to separate anion and cation resins. However, ammonium pentaborate or other amine pentaborate salts can be employed in admixture with other amine salts to form a solution having a density between the densities of the anion and cation resins so that the anion and cation resins are capable of being separated and metallic foulants removed from the resins in accordance with the method of the present invention. It is also believed that techniques are available for obtaining amine pentaborate salt solutions having a density capable of separating the anion and cation resins and allowing removal of metallic foulants from the resins.

Table VII sets forth the density of an amine salt solution prepared by bubbling carbon dioxide through about 20% v/v aqueous ammonia.

TABLE VII

Composition and Density (at 25° C.) of Mixtures of Aqueous Ammonia and Carbon Dioxide

| $C_{NH3}$ (%) initial | $CO_2$ (gm) added | $C_{NH3}$ (%)[1] | $C_{NH3}$ (%)[2] | Moles N / Moles C | density (gm/ml) |
|---|---|---|---|---|---|
| 19.4 | 32.8 ± 0.7 | 16.72 ± 0.04 | 14.2 ± 0.3 | 3.05 ± 0.07 | 1.067 |
| 19.5 | 34.3 ± 0.7 | 16.72 ± 0.04 | 14.8 ± 0.3 | 2.93 ± 0.06 | 1.073 |
| 19.7 | 37.0 ± 0.7 | 16.6 ± 0.1 | 15.8 ± 0.3 | 2.72 ± 0.06 | 1.083 |
| 18.9 | 41.1 ± 0.6 | 15.69 ± 0.03 | 17.1 ± 0.2 | 2.37 ± 0.03 | 1.106 |
| 18.8 | 43.0 ± 0.7 | 15.53 ± 0.03 | 17.9 ± 0.3 | 2.24 ± 0.04 | 1.114 |

TABLE VII-continued

Composition and Density (at 25° C.) of Mixtures of Aqueous Ammonia and Carbon Dioxide

| $C_{NH_3}$ (%) initial | $CO_2$ (gm) added | $C_{NH_3}$ (%)[1] | $C_{NH_3}$ (%)[2] | Moles N / Moles C | density (gm/ml) |
|---|---|---|---|---|---|
| 18.8 | 46.4 ± 0.7 | 15.31 ± 0.03 | 19.1 ± 0.3 | 2.07 ± 0.03 | 1.128 |
| 18.9 | 47.6 ± 0.5 | 15.26 ± 0.04 | 19.5 ± 0.2 | 2.03 ± 0.02 | 1.132 |
| 19.1 | 49.7 ± 0.6 | 15.24 ± 0.05 | 20.0 ± 0.2 | 1.97 ± 0.02 | 1.139 |
| 18.9 | 49.2 ± 0.6 | 15.16 ± 0.05 | 20.0 ± 0.2 | 1.96 ± 0.02 | 1.140 |

[1] $C_{NH_3}$ is the analytical (i.e., total) concentration of $NH_3$.
[2] $C_{CO_2}$ is the analytical (i.e., total) concentration of $CO_2$.

An important function of condensate polishers is to remove corrosion products from condensate system waters. The corrosion products are predominantly metallic. Removal of the metallic corrosion products from condensate water results in metallic fouling of the resins. The metallic foulants can be present on the resins in particulate, colloidal and ion-exchanged forms. Removal of the metallic foulants from the resins is highly desirable so as to help maintain resin performance.

Metallic foulant build-up tends to be greater on anion than on cation resin because cation resins are typically regenerated with acid. If not removed from the anion resin, regeneration of anion resin with sodium hydroxide can cause precipitation of gelatinous iron hydroxide within the anion resin beads, with resulting anion resin bead damage.

Generally, the longer a resin has been in service the greater will be the loading of metallic foulants onto the resin beads from the condensate water. Additionally, the amount and type of metallic fouling of resins is also related to the conditions of condensate system operation. Thus, during power plant start-up operations a mixed-resin bed can acquire a greater loading of magnetites (black iron oxides) than it would usually pick up in several weeks of normal operation. Furthermore, the types of metallic foulants present can be affected by conditions experienced by condensate system equipment prior to and during operation. Typically, condensate equipment that has been out of service for any significant period can, once returned to service, release hematites (red iron oxides) into the condensate water. Contrarily, condensate systems operated under full-flow conditions can release magnetites and various other metal oxides, hydrates, and hydroxides into the condensate water. Both hematites and magnetites are typical metallic foulants found in steam power plant condensate system water.

A schematic flow diagram of a process embodying features of the present invention is illustrated in the FIG. 1. With reference to FIG. 1, exhausted mixed resins in a water treatment zone 10 are transferred to a separation zone 12. The manner of transferring resins between zones is familiar to those skilled in the art. Exemplary resin transfer techniques employ water pressure, air pressure, and combinations thereof.

A mechanical cleaning step such as a backwash or air scrub step is preferably employed in the separation zone 12 to remove contaminants from the exhausted mixed resins before the resins are contacted with the amine salt solution. As used herein, the term "contaminants" includes, but is not necessarily limited to, resin fines and suspended corrosion products or metallic foulants, typically various iron and copper oxides. Although a backwash procedure can result in the partial separation of the resins into an anion layer and a cation layer in the separation zone 12, this separation is inadequate for many water polishing systems. Additionally, significant amounts of metallic foulants can continue to foul the resins even after repeated mechanical cleansing steps have been carried out.

An amine salt solution is introduced into the separation zone 12 for the purposes of separating the anion and cation resins and removing metallic foulants from the resins. The metallic foulants can be removed from the resin in several ways. Firstly, exposing the resin beads to an amine salt solution can cause the resin beads to undergo changes in diameter. Diameter changes can occur due to ion exchange between the amine salt solution and the resin beads and due to changes in concentration of the amine salt solution. As the concentration of the amine salt solution increases, the resin beads shrink, loosening adhering metallic foulants. When the concentration of the solution is increased to the point at which the anion resin floats in the amine salt solution, more metallic foulants are dislodged from the resin beads. Secondly, an amine salt solution can cause the organic molecules of a metal-organic complex adhering to the resin beads to relax or uncoil, again helping to free the metallic foulants from contact with the resin beads. Thirdly, metallic foulants can be "exchanged" by an ion exchange process into the amine salt solution.

To avoid exposing the resins to osmotic shock, it is preferred that an initial amine salt solution be introduced into the separation zone 12. The initial amine salt solution has a density less than the densities of the anion and cation resins. The density of the amine salt solution being introduced into the separation zone 12 is increased over a period of time so that the amine salt solution being introduced into the separation zone 12 has a density greater than the density of the anion resin and less than the density of the cation resin. While the density of the influent amine salt solution is being increased, the amine salt solution is allowed to exit from the separation zone 12.

The amine salt solution is preferably an ammonium sulfate solution. When the amine salt solution is ammonium sulfate and the metallic foulants include iron-containing particles, the metallic foulants can become suspended in the solution as ferrous and ferric ammonium sulfate. The ammonium sulfate solution can be introduced into the separation zone 12 by mixing dilute sulfuric acid with dilute ammonia to form a solution containing about 1 to about 2 percent weight/weight (% w/w) ammonium sulfate. The concentration of the ammonium sulfate in the solution can be gradually increased by increasing the amount of sulfuric acid and ammonia with respect to the amount of dilution water being employed. This increase can continue up to the formation of a solution having a desired final ammonium sulfate concentration. An exemplary final solution comprises about 25 to about 35% w/w ammonium sulfate. A preferred concentration is from about 28 to about 30% w/w. This later concentration has been found advantageous for the removal of metallic foulants from the resins. After reaching an ammonium sulfate concentration of about 12% w/w, an ammonium sulfate solution can be used to further increase the concentration of the influent ammonium sulfate solution to the separation zone 12. Preferably, a saturated ammonium sulfate solution is used for this purpose. By using saturated ammonium sulfate, the amount of heat generated during the formation of the desired ammonium sulfate solution concentration is reduced.

After reaching the desired amine salt solution concentration, the amine salt solution is preferably not permitted to exit the separation zone 12. Accordingly, the level of the amine salt solution in the separation zone 12 rises. Because the amine salt solution has a density greater than the density of the anion resin and less than the density of the cation resin, the anion resin floats and the cation resin sinks in the solution. As the height of the solution in the separation zone 12 increases, substantially all of the anion resin is lifted above substantially all of the cation resin in the separation zone 12 and a layer substantially devoid of anion and cation resins is formed between the separated resins. To avoid entraining any anion resin in the cation resin, it is preferred to backwash the amine salt solution into the separation zone 12. It is also preferred that the amine salt solution be slowly backwashed into the separation zone. The slow introduction of the amine salt solution reduces pushing or raising of the cation resin into the layer between the anion and cation resins.

In addition to separating the anion and cation resins from each other, the amine salt solution at least partially regenerates the cation resin.

Figure 2:
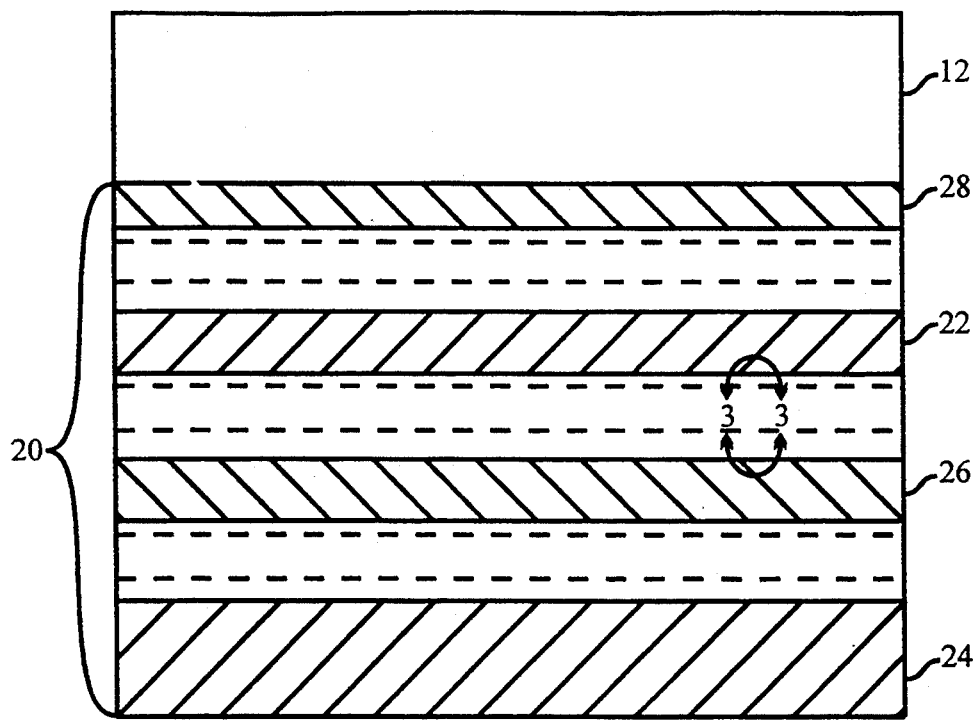
FIG. 2 is a diagram illustrative of a separation achieved by a process according to the present invention.
Figure 3:
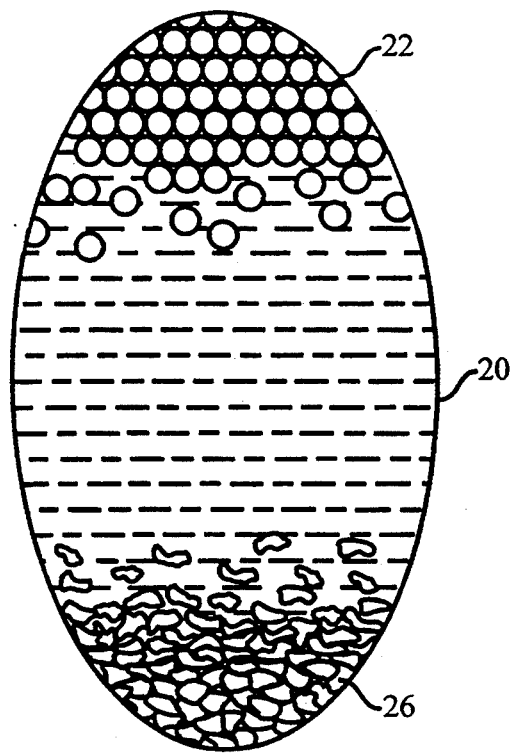
FIG. 3 is diagram showing an enlargement of the part of FIG. 2 bounded by the lines 3—3.

The amine salt solution can cause at least one layer or strata of metallic foulants to appear between the density separated anion and cation resins. A further layer of metallic foulants can also appear above the anion resin layer. FIG. 2 illustrates a separation of mixed-bed resins and metallic foulants upon use of an amine salt solution according to the present invention. An amine salt solution 20 is introduced into the separation zone 12. The anion resin 22 floats while the cation resin 24 sinks in the solution. A layer of metallic foulants 26 with densities intermediate to the anion and cation resin densities becomes dislodged from the resins and suspended in the solution between the two separated resin layers. Metallic foulants with densities less than the density of the anion resin can become dislodged from the resins and float in the solution above the anion resin as a second layer of metallic foulants 28. FIG. 3 illustrates an enlargement of the part of FIG. 2 bounded by the lines 3—3. FIG. 3 shows part of the metallic foulant layer 26 and the anion resin layer 22 suspended in the amine salt solution 20. In FIGS. 2 and 3 the relative widths of the various layers, and of the separations between layers, and the relative sizes of the generally spherical resin beads and the irregularly shaped metallic foulant particles are not drawn to scale.

A composition comprising the anion resin, the cation resin, the suspended metallic foulants, and the amine salt solution having a density greater than the density of the anion resin but less than the density of the cation resin is formed by the differential buoyancies of the resins and the metallic foulants in the amine salt solution. To aid in separating the anion and cation resins, it is preferred that the composition be allowed to sit for a period of time to allow any anion resin entrapped in the cation resin to float and any cation resin entrapped in the anion resin to sink. An exemplary period of time for separation of the resins is at least about ten minutes.

Preferably, the metallically fouled resins are allowed to soak in the amine salt solution for from about 1 hour to about 6 hours to allow dislodgement and ion exchange of the metallic foulants into the amine salt solution. Less than about a 1-hour soak does not allow maximum metallic defouling of the resins to occur. More than about a 6-hour soak can allow some metallic foulants to migrate further into the resin beads, resulting in an intractable metallic fouling. A soaking time of from about 1 to about 2 hours is particularly preferred for maximum metallic defouling with little intractable metallic fouling.

After soaking, the separated anion resin, cation resin, and metallic foulant layers are removed from contact with each other. The anion and cation resins are transferred from the separation zone 12 to the anion and cation regeneration zones 14 and 16, respectively. There are a variety of ways to remove the separated resins and metallic foulant layers from proximity to each other.

The cation resin can be removed from the separation zone by bottom transfer. Alternately, before transfer of the cation resin, an appropriately positioned layer of metallic foulants 26 can be removed from the separation zone by transfer out through a valve in a side wall of the separation vessel.

There are at least three ways to remove anion resin and the layer of metallic foulants 28 from proximity to each other. For example, amine salt solution can be backwashed through the separated resins causing the level of the metallic foulant layer 28 to rise above the top of the separation vessel. Top transfer of the layer of metallic foulants 28 is thereby accomplished. Alternately, an appropriately positioned layer of metallic foulants 28 can be removed from the separation vessel by transfer out through a valve in a side wall of the separation vessel. Finally, an appropriately positioned layer of anion resin can be removed from the separation vessel by transfer out through a valve in a side wall of the separation vessel.

The suspended metallic foulants transferred out or remaining in the separation zone can be discarded or filtered in order to recover the amine salt solution.

The flow rate at which the transfer takes place is sufficiently low (approximately 1–2 gpm/sq ft) so as to maintain the metallic foulant layer and minimize metallic foulant dispersion. A flow rate of greater than about 3 gpm/sq ft can cause significant dispersion and mixing of the resins and metallic foulants layers.

The separated anion resin and cation resin are next rinsed with water to remove the amine salt solution therefrom. To ensure optimum removal of the amine salt solution from the anion and cation resins, the water rinse is preferably a two-step procedure wherein each resin is first slowly rinsed with water and then rinsed with water at a faster rate. Typically, the fast rinse step is conducted at a rate of about two to about three times the rate of the slow rinse step. In addition, the rates at which the anion resin is rinsed in the slow and fast rinse steps are generally slower than the rates at which the cation resin is rinsed in the corresponding steps.

The anion resin in the anion regeneration zone 14 can be regenerated by any anion regeneration technique known to those skilled in the art. Similarly, the cation resin in the cation regeneration zone 16 can be regenerated by any cation regeneration technique known to those skilled in the art. Exemplary techniques for regenerating anion and cation resins are disclosed in U.S. Pat. Nos. 4,511,675 and 4,820,421, both of these documents being incorporated herein by this reference. Regeneration of the resins also helps to remove "exchanged" metallic foulants from the resins.

To remove the regenerating solutions from the regenerated resins, the regenerated anion and cation resins in the cation and anion regeneration zones 14 and 16, respectively, are rinsed with water. This water rinse procedure is, for the reasons discussed above with respect to removing the amine salt solution from the resins, preferably also conducted in a slow-fast, two-step procedure. The rinsed anion and cation resins are next preferably backwashed with water to further assure that no residual regenerating solution remains in either the anion or cation regeneration zone 14 or 16, and to remove resin fines.

The regenerated and rinsed anion and cation resins are transferred to a recombination zone 18. The anion and cation resins are thoroughly mixed by passing air through the recombination zone 18. The mixed resins are next rinsed with water to further lower the conductivity of the effluent water to the operating conductivity level. Exemplary operating conductivity levels for fossil and nuclear generating plants are 0.1 and 0.07 $\mu$MHO/cm, respectively. The mixed resins are then transferred to the water treatment zone 10. The service zone is now ready to be put back into operation.

With respect to the temperatures at which the method of the present invention is conducted, it is preferred that the operating temperature be below about 125° F. to avoid damaging the anion resin. In addition, to avoid cracking the resins, it is preferred that the operating temperature be above freezing. In practice, the operating temperature is not allowed to drop below about 40° F. because below this temperature the amine salt solution can begin to crystalize. Additionally, below about 40° F. metallic foulant migration into the amine salt solution is less than optimal. Because the specific gravity of a solution increases with decreasing temperature, the operating temperature is also preferably low. Furthermore, to avoid subjecting the anion and cation resins to osmotic shock, it is preferred to conduct the method of the instant invention at substantially constant or slowly changing temperatures. A preferred temperature for the soaking period is from about 90° F. to about 100° F. so as to obtain an optimal metallic defouling of the resins.

In a first exemplary embodiment of the present invention, the procedures performed in the separation zone 12, cation regeneration zone 16, and recombination zone 18 are performed in the same vessel. In this embodiment the separation step removes substantially all of the anion resin from an upper portion of the vessel and transfers the anion resin to the anion regeneration zone 14. Nevertheless, it is preferred that additional amine salt solution be introduced into the vessel and any residual anion resin in the vessel be allowed to be floated by the amine salt solution. The floated anion resin is then transferred from the upper portion of the vessel to the anion regeneration zone 14.

In a second exemplary embodiment of the present invention, the procedures performed in the separation zone 12, anion regeneration zone 14, and recombination zone 18 are performed in the same vessel. In this embodiment the separation step removes substantially all of the cation resin from the bottom of the vessel and transfers the cation resin to the cation regeneration zone 16. Optionally, additional amine salt solution can be introduced into the vessel to dislodge any residual cation resin in the vessel. The dislodged cation resin can then be transferred from the bottom of the vessel to the cation regeneration zone 16.

Generally, the anion resin has a density less than the density of the cation resin. However, it is believed that there are certain situations wherein the anion resin can have a density greater than the density of the cation resin. Nevertheless, as long as the densities of the anion and cation resins differ, the process of the instant invention can be employed to separate the anion and cation resins.

Accordingly, the method of the instant invention is capable of substantially separating the cation and anion resins present in a mixed bed without adversely exhausting either resin. For example, if ammonium sulfate is employed as the amine salt solution, the cation resin is regenerated to the ammonium form. The ammonium form of the cation resin is typically used in a mixed bed to treat water in fossil fuel power plants. Even if it is desired to have the cation resin in the hydrogen form, as, for example, in nuclear power plants, the cation resin can be successfully further regenerated to the hydrogen form with, for example, sulfuric acid. In addition, any ammonium leakage from the cation resin is not detrimental because ammonia is typically added to control the pH of the effluent water from the mixed bed.

With respect to the anion resin, when ammonium sulfate is employed as the amine salt solution, the anion resin is put into the sulfate form. Sulfate ions are commonly used to strip anions, e.g., chloride, from anion resins. The sulfate-exhausted anion resin is readily regenerated with sodium hydroxide to the hydroxyl form. Furthermore, any residual sulfate on the anion resin does not contribute to any sulfate leakage because sulfate ions as opposed to bisulfate are strongly held by the anion resin and are not displaced by ions that are typically present in the influent water to the mixed bed.

In addition, in accordance with the present invention neither the size nor the bulk volume of either resin is employed as an operable parameter to separate the anion and cation resins. Instead, the different densities of the anion and cation resins are employed to separate the resins. Accordingly, the size and bulk volume of the resins used in the mixed bed are not restricted by the method of the present invention. Furthermore, a process according to the present invention using an amine salt solution allows significant amounts of metallic foulants to be removed from metallically fouled resins.

Although the present invention has been described in considerable detail with reference to certain preferred versions thereof, other versions are possible. For example, the same vessel can be used to house the water treatment zone 10, separation zone 12, the recombination zone 18, and either the anion regeneration zone 14 or the cation regeneration zone 16. In addition, the recombined anion and cation resins can optionally be transferred to a storage zone prior to being introduced into the water treatment zone 10. Alternatively, the recombination zone and storage zone can be located in the same vessel. Therefore, the spirit and scope of the appended claims should not necessarily be limited to the description of the preferred versions contained herein.

What is claimed is:

1. A method for separating a mixed bed of anion and cation resins and for removing metallic foulants from the mixed bed, comprising the steps of:
   (a) introducing an amine salt solution into a separation zone containing the mixed bed of resins, the amine salt solution having a density greater than the density of the anion resin and less than the density of the cation resin, whereby
   (i) the anion resin floats and the cation resin sinks in the amine salt solution,
   (ii) the cation resin is at least partially regenerated by the amine salt solution, and
   (iii) metallic foulants with densities greater than the density of the anion resin and less than the density of the cation resin are displaced from the resins and become suspended in the amine salt solution between the anion resin and the cation resin; and
   (b) separating the anion resin, the cation resin, and the amine salt solution containing suspended metallic foulants from each other so that substantially all of the anion resin occupies an anion regeneration zone, and substantially all of the cation resin occupies a cation regeneration zone.

2. The method of claim 1, further comprising the steps of:
   (1) rinsing the cation resin in the cation regeneration zone and the anion resin in the anion regeneration zone to displace amine salt solution from the resins; and
   (2) regenerating the anion resin.

3. The method of claim 2, wherein metallic foulants with densities less than the density of the anion resin are displaced from the resins and become suspended in the amine salt solution above the anion resin.

4. The method of claim 2, wherein the mixed bed of resins comprises at least about 25% v/v cation resin.

5. The method of claim 2, wherein prior to step (a) the mixed bed of anion and cation resins is transferred from a service zone to the separation zone.

6. The method of claim 2, comprising the additional step of further regenerating the cation resin after step (a).

7. The method of claim 2, wherein the step of separating comprises removing substantially all the amine salt solution with suspended metallic foulants from the resins.

8. The method of claim 2, wherein the separation zone and the cation regeneration zone are located in the same vessel.

9. The method of claim 8, wherein after step (b) the method further comprises the steps of (i) introducing additional amine salt solution into the cation regeneration zone, (ii) allowing any residual anion resin in the cation regeneration zone to be floated by the solution, and (iii) transferring substantially all of the floated residual anion resin from the cation resin regeneration zone to the anion resin regeneration zone.

10. The method of claim 2, wherein the separation zone and the anion regeneration zone are located in the same vessel.

11. The method of claim 2, wherein before step (a) the mixed resins are mechanically cleaned, the mechanical cleansing step being employed to remove contaminants from the resins.

12. The method of claim 2, further comprising the steps of (i) introducing an initial amine salt solution into the mixed resins, the initial amine salt solution having a density less than the densities of the anion and cation resins, and (ii) increasing the density of the amine salt solution being introduced into the mixed resins so that the amine salt solution being introduced into the mixed resins has a density of the amine salt solution of step (a).

13. The method of claim 2, wherein the amine salt solution comprises an amine salt having a cation moiety and an anion moiety, the cation moiety being selected from the group consisting of hydrazine, cyclohexamine, morpholine, and ammonium.

14. The method of claim 2, wherein the amine salt solution comprises an amine salt having a cation moiety and an anion moiety, the anion moiety being selected from the group consisting of sulfate, bisulfate, carbonate, bicarbonate, citrate, nitrate, oxalate, acetate, pentaborate, and mixtures thereof.

15. The method of claim 13, wherein the cation moiety is ammonium.

16. The method of claim 14, wherein the anion moiety is selected from the group consisting of sulfate, bisulfate, carbonate, bicarbonate and citrate.

17. The method of claim 2, wherein the amine salt solution is an ammonium sulfate solution.

18. The method of claim 2, wherein the metallic foulants comprise iron-containing particles.

19. A method for separating a mixture of anion and cation resins and for removing iron-containing foulants from the mixture, comprising the step of combining the mixture in a separation zone with an amine salt solution, the amine salt solution having a density greater than the density of the anion resin and less than the density of the cation resin whereby:
   (a) the anion resin floats in the amine salt solution;
   (b) the cation resin sinks in the amine salt solution;
   (c) iron-containing foulants with densities greater than the density of the anion resin and less than the density of the cation resin are displaced from the resins and become suspended in the amine salt solution between the anion resin and the cation resin; and
   (d) iron-containing foulants with densities less than the density of the anion resin are displaced from the resins and become suspended in the amine salt solution above the anion resin;
   so that substantially all of the amine salt solution containing suspended iron-containing foulants can be separated from substantially all of the anion and cation resin.

20. The method of claim 19, wherein the mixed bed of resins comprises at least about 25% v/v cation resin.

21. The method of claim 19, further comprising the step of removing substantially all of the anion resin from the separation zone to an anion regeneration zone, and thereby separating the anion resin from the cation resin.

22. The method of claim 21, further comprising the steps of (i) introducing additional amine salt solution into the separation zone, (ii) allowing any residual anion resin in the separation zone to be floated by the solution, and (iii) removing substantially all of the floated residual anion resin from the separation zone to the anion regeneration zone, thereby separating substantially all residual anion resin from the cation resin.

23. The method of claim 19, further comprising the step of removing substantially all of the cation resin from the separation zone to a cation regeneration zone and thereby separating the cation resin from the anion resin.

24. The method of claim 19 wherein, prior to the step of combining the mixture with the amine salt solution, the method further comprises the steps of:
 (a) introducing an initial amine salt solution into the separation zone wherein the initial amine salt solution has a density less than the densities of the anion and cation resins; and
 (b) increasing the density of the amine salt solution being introduced into the separation zone so that the amine salt solution being introduced into the separation zone has a density greater than the density of the anion resin and less than the density of the cation resin.

25. A method for separating a mixture of anion and cation resins and for removing metallic foulants from the mixture, comprising the step of combining the mixture in a separation zone with an amine salt solution having a density between the densities of the anion and cation resins whereby one resin floats in the amine salt solution, the other resin sinks in the amine salt solution, metallic foulants with densities between the densities of the resins are displaced from the resins and become suspended in the amine salt solution between the anion resin and the cation resin, and metallic foulants with densities less than the densities of both resins are displaced from the resins and become suspended in the amine salt solution above both resins, so that substantially all of the anion resin can be separated from substantially all of the cation resin and substantially all of the amine salt solution containing suspended metallic foulants can be separated from substantially all of the anion and cation resin.

26. The method of claim 1 wherein the mixed bed of resins comprises at least about 25% v/v cation resin.

27. The method of claim 26 wherein the amine salt in the amine salt solution has a cation moiety and an anion moiety, the cation moiety being selected from the group consisting of hydrazine, cyclohexamine, morpholine and ammonium, and mixtures thereof, and the anion moiety being selected from the group consisting of sulfate, bisulfate, carbonate, bicarbonate, citrate, nitrate, oxalate, acetate and pentaborate, and mixtures thereof.

28. The method of claim 1 wherein the amine salt in the amine salt solution has a cation moiety and an anion moiety, the cation moiety being selected from the group consisting of hydrazine, cyclohexamine, morpholine and ammonium, and mixtures thereof, and the anion moiety being selected from the group consisting of sulfate, bisulfate, carbonate, bicarbonate, citrate, nitrate, oxalate, acetate and pentaborate, and mixtures thereof.

29. The method of claim 25 wherein the mixture comprises at least about 25% v/v cation resin.

30. The method of claim 29 wherein the amine salt in the amine salt solution has a cation moiety and an anion moiety, the cation moiety being selected from the group consisting of hydrazine, cyclohexamine, morpholine and ammonium, and mixtures thereof, and the anion moiety being selected from the group consisting of sulfate, bisulfate, carbonate, bicarbonate, citrate, nitrate, oxalate, acetate and pentaborate, and mixtures thereof.

31. The method of claim 20 wherein the amine salt in the amine salt solution has a cation moiety and an anion moiety, the cation moiety being selected from the group consisting of hydrazine, cyclohexamine, morpholine and ammonium, and mixtures thereof, and the anion moiety being selected from the group consisting of sulfate, bisulfate, carbonate, bicarbonate, citrate, nitrate, oxalate, acetate and pentaborate, and mixtures thereof.

32. A method for separating a mixed bed of anion and cation resins and for removing the metallic foulants from the mixed bed, the method comprising the steps of:
 (a) introducing an amine salt solution into a separation zone containing the mixed bed of resins, the amine salt solution having a density greater than the density of the anion resin and less than the density of the cation resin, and the amine salt comprising a cation moiety selected from the group of hydrazine, cyclohexamine, morpholine, ammonia, and mixtures thereof, whereby
  (i) the anion resin floats and the cation resin sinks in the amine salt solution,
  (ii) the cation resin is at least partially regenerated by the amine salt solution, and
  (iii) metallic foulants with densities greater than the density of anion resin and less than the density of the cation resin are displaced from the resins and become suspended in the amine salt solution between the anion resin and the cation resin; and
 (b) separating the anion resin, the cation resin, and the amine salt solution containing suspended metallic foulants from each other so that substantially all of the anion resin occupies an anion regeneration zone, and substantially all of the cation resin occupies a cation regeneration zone.

33. The method of claim 32, wherein the amine salt comprises an anion moiety selected from the group consisting of sulfate, bisulfate, carbonate, bicarbonate, citrate, nitrate, oxalate, acetate, pentaborate, and mixtures thereof.

34. The method of claim 32, wherein the mixed bed of resins comprises at least about 25% v/v cation resin.

35. The method of claim 32, further comprising the steps of:
 (a) rinsing the cation resin in the cation regeneration zone and the anion resin in the anion regeneration zone to displace amine salt solution from the resins; and
 (b) regenerating the anion resin.

36. The method of claim 32, wherein metallic foulants with densities less than the density of the anion resin are displaced from the resins and become suspended in the amine salt solution above the anion resin.

37. The method of claim 32, wherein the step of separating comprises removing substantially all the amine salt solution with suspended metallic foulants from the resins.

38. The method of claim 32, wherein the amine salt in the amine salt solution comprises ammonium sulfate.

39. The method of claim 32, wherein the metallic foulants comprise iron-containing particles.

* * * * *